(12) United States Patent
Kiyokawa et al.

(10) Patent No.: US 11,307,175 B2
(45) Date of Patent: Apr. 19, 2022

(54) DIAGNOSIS APPARATUS, DIAGNOSIS METHOD, AND COMPUTER-READABLE RECORDING MEDIUM

(71) Applicant: NEC CORPORATION, Tokyo (JP)

(72) Inventors: Yu Kiyokawa, Tokyo (JP); Shigeru Kasai, Tokyo (JP); Shohei Kinoshita, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/734,782

(22) PCT Filed: Jun. 5, 2018

(86) PCT No.: PCT/JP2018/021599
§ 371 (c)(1),
(2) Date: Dec. 3, 2020

(87) PCT Pub. No.: WO2019/234832
PCT Pub. Date: Dec. 12, 2019

(65) Prior Publication Data
US 2021/0231617 A1    Jul. 29, 2021

(51) Int. Cl.
*G01N 29/12* (2006.01)
(52) U.S. Cl.
CPC .................. *G01N 29/12* (2013.01)
(58) Field of Classification Search
CPC .............. G01M 7/00; G01G 19/086
See application file for complete search history.

(56) References Cited

U.S. PATENT DOCUMENTS 5,327,358 A     7/1994 Stubbs
9,581,570 B2*  2/2017 Caicedo ............. G01N 29/4472
(Continued)

FOREIGN PATENT DOCUMENTS

JP      2015-064347 A    4/2015
JP      2016-177530 A   10/2016
JP         6205091 B2    9/2017

OTHER PUBLICATIONS

International Search Report for PCT/JP2018/021599 dated Aug. 28, 2018 [PCT/ISA/210].
(Continued)

*Primary Examiner* — Natalie Huls
*Assistant Examiner* — Cynthia L. Davis

(57) ABSTRACT

A diagnosis apparatus 1 including: a target vibration information generation unit 2 that generates pieces of target vibration information; a comparative relationship information generation unit 3 that generates pieces of comparative relationship information indicating relationships among the pieces of target vibration information, or the pieces of comparative relationship information indicating relationships among pieces of reference vibration information and the pieces of target vibration information, the pieces of reference vibration information indicating vibrations in the target mode among vibrations that are measured in a reference period; and a diagnosis unit 5 that diagnoses that a change has occurred in the structure 20 between the diagnosis period and the reference period based on a result of comparison between a distribution of pieces of reference relationship information and the distribution that has been calculated in relation to the pieces of comparative relationship information.

6 Claims, 6 Drawing Sheets

(56) References Cited

U.S. PATENT DOCUMENTS

| | | | |
|---|---|---|---|
| 9,874,472 B2* | 1/2018 | Tarassenko | G01H 1/006 |
| 2005/0060105 A1* | 3/2005 | Lander | G01M 3/243 |
| | | | 702/51 |
| 2005/0075846 A1* | 4/2005 | Kim | G01N 29/245 |
| | | | 703/1 |
| 2013/0268154 A1* | 10/2013 | Kreitmair-Steck | B64F 5/60 |
| | | | 701/29.1 |
| 2014/0109679 A1 | 4/2014 | Rodriguez | |
| 2016/0041070 A1* | 2/2016 | Wascat | G01M 7/00 |
| | | | 702/183 |
| 2017/0076563 A1* | 3/2017 | Guerriero | G01M 3/002 |
| 2019/0178702 A1* | 6/2019 | Holden | G01G 19/086 |

OTHER PUBLICATIONS

Written Opinion for PCT/JP2018/021599 dated Aug. 28, 2018 [PCT/ISA/237].

English translation of Written opinion for PCT Application No. PCT/JP2018/021599, dated Aug. 28, 2018.

* cited by examiner

DIAGNOSIS APPARATUS, DIAGNOSIS METHOD, AND COMPUTER-READABLE RECORDING MEDIUM

CROSS REFERENCE TO RELATED APPLICATIONS

This application is a National Stage of International Application No. PCT/JP2018/021599 filed Jun. 5, 2018.

TECHNICAL FIELD

The present invention relates to a diagnosis apparatus and a diagnosis method that diagnose a structure, and further relates to a computer-readable recording medium in which a program for realizing them is recorded.

BACKGROUND ART

There is a method that makes a diagnosis using a Modal Assurance Criterion (MAC) as a method of diagnosing a change, such as deterioration and damage, in a structure. With this method, first, a MAC value indicating a similarity degree (or relationship) is calculated using a mode vector indicating vibration in a predetermined mode that was measured before the change occurred and a mode vector indicating vibration in the mode that was measured after the change occurred, and a change between the two mode vectors is quantified.

Next, with use of the calculated MAC value, whether the two mode vectors are similar to each other is diagnosed. The closer the MAC value to "1", the higher the degree of similarity between the two mode vectors, whereas the closer the MAC value to "0", the lower the degree of similarity between the two mode vectors. Therefore, when the MAC value is small, it can be diagnosed that the change occurred in the structure.

As a related technique, patent document 1 discloses an apparatus that improves the analysis accuracy of an analysis model that is used in analyzing a structure. The apparatus disclosed in patent document 1 first calculates a MAC value from a mode vector calculated using the result of a vibration test that was carried out with respect to a structure, and a mode vector calculated using an analysis model of the structure. Then, with use of the calculated MAC value, the apparatus disclosed in patent document 1 evaluates the extent of similarity between the mode vector calculated using the result of the vibration test and the mode vector calculated using the analysis model.

LIST OF RELATED ART DOCUMENTS

Patent Document
Patent document 1: Japanese Patent Laid-Open Publication No. 2016-177530

SUMMARY OF INVENTION

Technical Problems

However, in the actual diagnosis of a change in a structure, a mode vector varies with each measurement due to such influences as allowable error and the measurement accuracy of a sensor mounted on the structure, the accuracy of vibration generation in vibration tests (e.g., hammering tests), and a load on the structure. Therefore, as there is variation in both of the predetermined mode vector that was measured before the occurrence of the change and the mode vector that was measured after the occurrence of the change, it is difficult to diagnose the change in the structure with high accuracy even with use of a MAC value calculated based on the two mode vectors.

Furthermore, the apparatus disclosed in patent document 1 is an apparatus that improves the analysis accuracy of an analysis model that is used in analyzing a structure, and is not an apparatus that diagnoses a change in a structure. Moreover, when there is measurement variation in vibration tests, the apparatus disclosed in patent document 1 cannot improve the analysis accuracy of an analysis model even with use of a MAC value that has been generated based on a mode vector generated using the result of a vibration test and on a mode vector generated using the analysis model.

An example object of the present invention is to provide a diagnosis apparatus, a diagnosis method, and a computer-readable recording medium that improve the accuracy of diagnosis of a change in a structure.

Solution the Problems

In order to achieve the aforementioned object, a diagnosis apparatus according to an example aspect of the present invention includes:

target vibration information generation unit that generates pieces of target vibration information indicating vibrations in a target mode among vibrations of a structure that are measured in a diagnosis period using a plurality of sensors;

comparative relationship information generation unit that generates pieces of comparative relationship information indicating relationships among the pieces of target vibration information, or the pieces of comparative relationship information indicating relationships among pieces of reference vibration information and the pieces of target vibration information, the pieces of reference vibration information indicating vibrations in the target mode among vibrations that are measured in a reference period that is different from the diagnosis period;

distribution calculation unit that calculates a distribution of the pieces of comparative relationship information; and diagnosis unit that diagnoses that a change has occurred in the structure between the diagnosis period and the reference period based on a result of comparison between a distribution of pieces of reference relationship information indicating relationships among the pieces of reference vibration information and the distribution that has been calculated in relation to the pieces of comparative relationship information.

Furthermore, in order to achieve the aforementioned object, a diagnosis method according to an example aspect of the present invention includes:

(a) a step of generating pieces of target vibration information indicating vibrations in a target mode among vibrations of a structure that are measured in a diagnosis period using a plurality of sensors;

(b) a step of generating pieces of comparative relationship information indicating relationships among the pieces of target vibration information, or the pieces of comparative relationship information indicating relationships among pieces of reference vibration information and the pieces of target vibration information, the pieces of reference vibration information indicating vibrations in the target mode among vibrations that are measured in a reference period that is different from the diagnosis period;

(c) a step of calculating a distribution of the pieces of comparative relationship information; and (d) a step of diagnosing that a change has occurred in the structure between the diagnosis period and the reference period based on a result of comparison between a distribution of pieces of reference relationship information indicating relationships among the pieces of reference vibration information and the distribution that has been calculated in relation to the pieces of comparative relationship information.

Moreover, in order to achieve the aforementioned object, a computer-readable recording medium having recorded therein a diagnosis program according to an example aspect of the present invention causes a computer to execute:

(a) a step of generating pieces of target vibration information indicating vibrations in a target mode among vibrations of a structure that are measured in a diagnosis period using a plurality of sensors;

(b) a step of generating pieces of comparative relationship information indicating relationships among the pieces of target vibration information, or the pieces of comparative relationship information indicating relationships among pieces of reference vibration information and the pieces of target vibration information, the pieces of reference vibration information indicating vibrations in the target mode among vibrations that are measured in a reference period that is different from the diagnosis period;

(c) a step of calculating a distribution of the pieces of comparative relationship information; and (d) a step of diagnosing that a change has occurred in the structure between the diagnosis period and the reference period based on a result of comparison between a distribution of pieces of reference relationship information indicating relationships among the pieces of reference vibration information and the distribution that has been calculated in relation to the pieces of comparative relationship information.

Advantageous Effects of the Invention

As described above, according to the present invention, the accuracy of diagnosis of a change in a structure can be improved.

EXAMPLE EMBODIMENT (Example Embodiment)

The following describes an example embodiment of the present invention with reference to FIG. 1 to FIG. 6.

[Apparatus Configuration]

Figure 1:
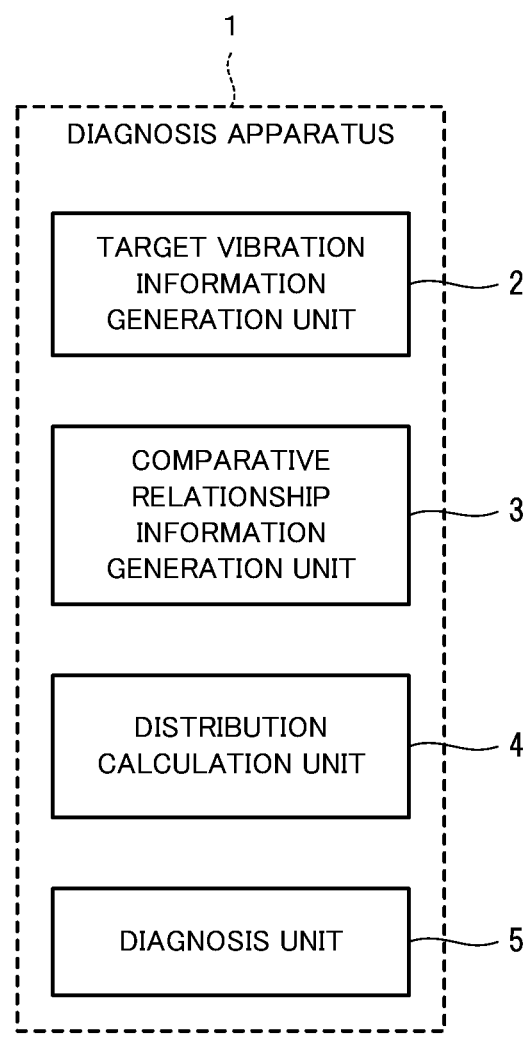
FIG. 1 is a diagram for showing an example of a diagnosis apparatus.

First, a description is given of a configuration of a diagnosis apparatus according to the present example embodiment using FIG. 1. FIG. 1 is a diagram for showing an example of a diagnosis apparatus.

As shown in FIG. 1, a diagnosis apparatus 1 according to the present example embodiment is an apparatus that is capable of improving the accuracy of diagnosis of a change (abnormality), such as deterioration and damage, in a structure. As shown in FIG. 1, the diagnosis apparatus 1 includes target vibration information generation unit 2, comparative relationship information generation unit 3, distribution calculation unit 4, and diagnosis unit 5.

Among these, the target vibration information generation unit 2 generates target vibration information indicating vibrations in a target mode among vibrations of a structure that were measured in a diagnosis period using a plurality of sensors. The target vibration information is, for example, a mode vector, a coordinate mode vector, or the like.

The comparative relationship information generation unit 3 generates comparative relationship information indicating the relationship between reference vibration information indicating vibrations in the target mode among vibrations that were measured in a reference period, which is different from the diagnosis period, and the target vibration information in the diagnosis period. That is to say, the comparative relationship information generation unit 3 generates the comparative relationship information using the reference vibration information generated in the reference period, which precedes the diagnosis period, and the target vibration information in the diagnosis period.

Alternatively, the comparative relationship information generation unit 3 may generate comparative relationship information indicating the relationship between pieces of target vibration information. That is to say, the comparative relationship information generation unit 3 generates the comparative relationship information using only vibrations that were measured in the diagnosis period. The comparative relationship information is, for example, a MAC, a Coordinate Modal Assurance Criterion (COMAC), or the like.

The distribution calculation unit 4 calculates the distribution of pieces of comparative relationship information. The distribution is, for example, a frequency distribution obtained by analyzing a frequency regarding the pieces of comparative relationship information or the like. The diagnosis unit 5 diagnoses whether a change occurred in the structure between the diagnosis period and the reference period based on the result of comparison between the distribution of pieces of reference relationship information indicating the relationships among pieces of reference vibration information and the distribution calculated in relation to pieces of comparative relationship information. In the diagnosis based on the distributions, for example, hypothesis testing and the like are used.

As such, in the present example embodiment, whether a change has occurred in the structure is diagnosed based on the result of comparison between the distribution of pieces of reference relationship information and the distribution of pieces of comparative relationship information, and thus the accuracy of diagnosis of a change in the structure is improved. That is to say, even if a mode vector varies with each measurement due to such influences as allowable error and the measurement accuracy of the sensors mounted on the structure, the accuracy of vibration generation in vibration tests, and a load on the structure, a change in the structure can be diagnosed with high accuracy due to the presence of a standard.

Figure 2:
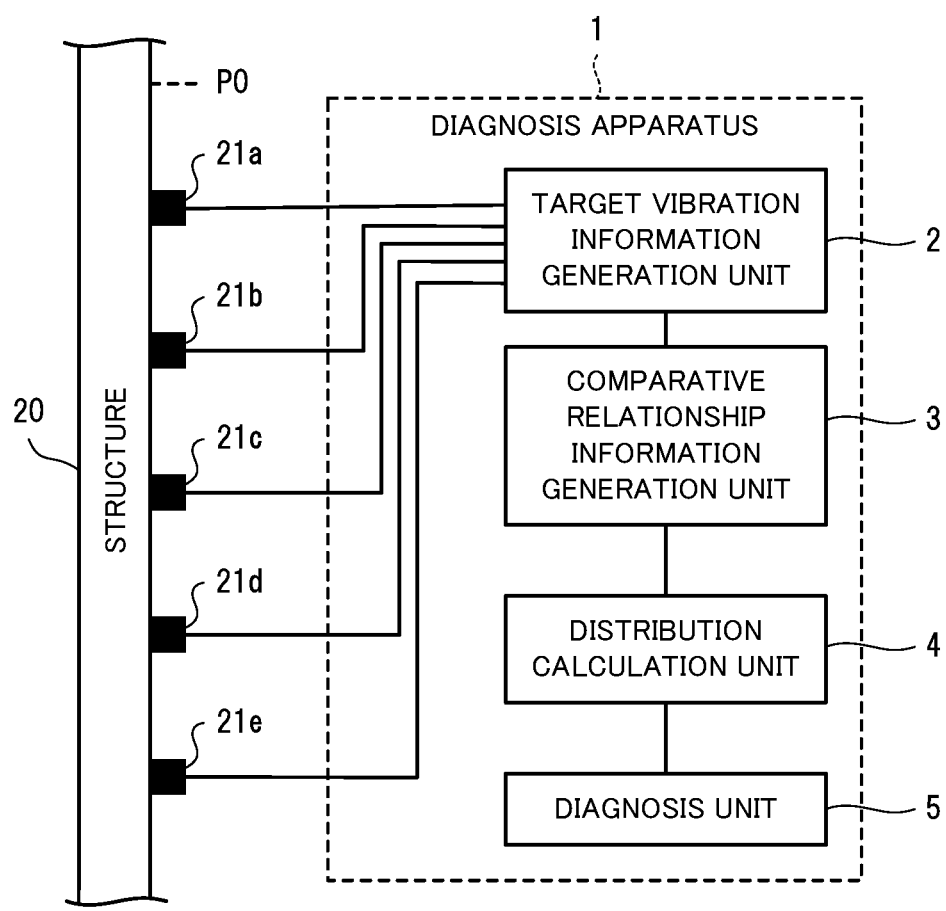
FIG. 2 specifically is a diagram for showing the diagnosis apparatus and a system that includes the diagnosis apparatus.

Next, a configuration of the diagnosis apparatus 1 according to the present example embodiment will be described more specifically using FIG. 2. FIG. 2 specifically is a diagram for showing the diagnosis apparatus and a system that includes the diagnosis apparatus.

As shown in FIG. 2, the system according to the present example embodiment includes the diagnosis apparatus 1 and a plurality of sensors 21 (in FIG. 2, the sensors 21 are depicted as sensors 21a, 21b, 21c, 21d, 21e). Also, the diagnosis apparatus 1 includes a target vibration information generation unit 2, a comparative relationship information generation unit 3, a distribution calculation unit 4, and a diagnosis unit 5.

A structure 20 is, for example, a structure that has been constructed using a hardened material that has been solidified using at least sand, water, and cement (e.g., concrete or mortar) and/or a metal. Also, the structure 20 is an entirety or a part of a building. Furthermore, the structure 20 is an entirety or a part of machinery.

The sensors 21 are attached to the structure 20, measure at least the magnitudes of vibrations of the structure 20, and transmit information indicating the measured magnitudes of vibrations to the diagnosis apparatus 1. For example, the sensors 21 transmit signals that include information indicating the measured magnitudes of vibrations to the diagnosis apparatus 1. For example, three-axis accelerometers, fiber sensors, and the like can be used as the sensors 21.

Specifically, as shown in FIG. 2, each of the plurality of sensors 21a to 21e that are attached to the structure 20 measures acceleration at the position where it is attached. Subsequently, each of the plurality of sensors 21a to 21e transmits a signal that includes information of the measured acceleration to the diagnosis apparatus 1. Note that wired communication, wireless communication, or the like is used in the exchange between the sensors 21 and the diagnosis apparatus 1.

The target vibration information generation unit 2 generates target vibration information indicating vibrations in a target mode among vibrations of the structure 20 that were measured using the plurality of sensors 21a to 21e in the aforementioned reference period and diagnosis period. Specifically, the target vibration information generation unit 2 calculates, for example, a mode vector in the target mode, which has been set in advance, based on information indicating the magnitudes of vibrations (vibrational waves) of the structure 20 that were measured by the plurality of sensors 21a to 21e in the aforementioned diagnosis period and reference period. Note that target vibration information generated in the reference period will hereinafter be referred to as reference vibration information.

Figure 3:
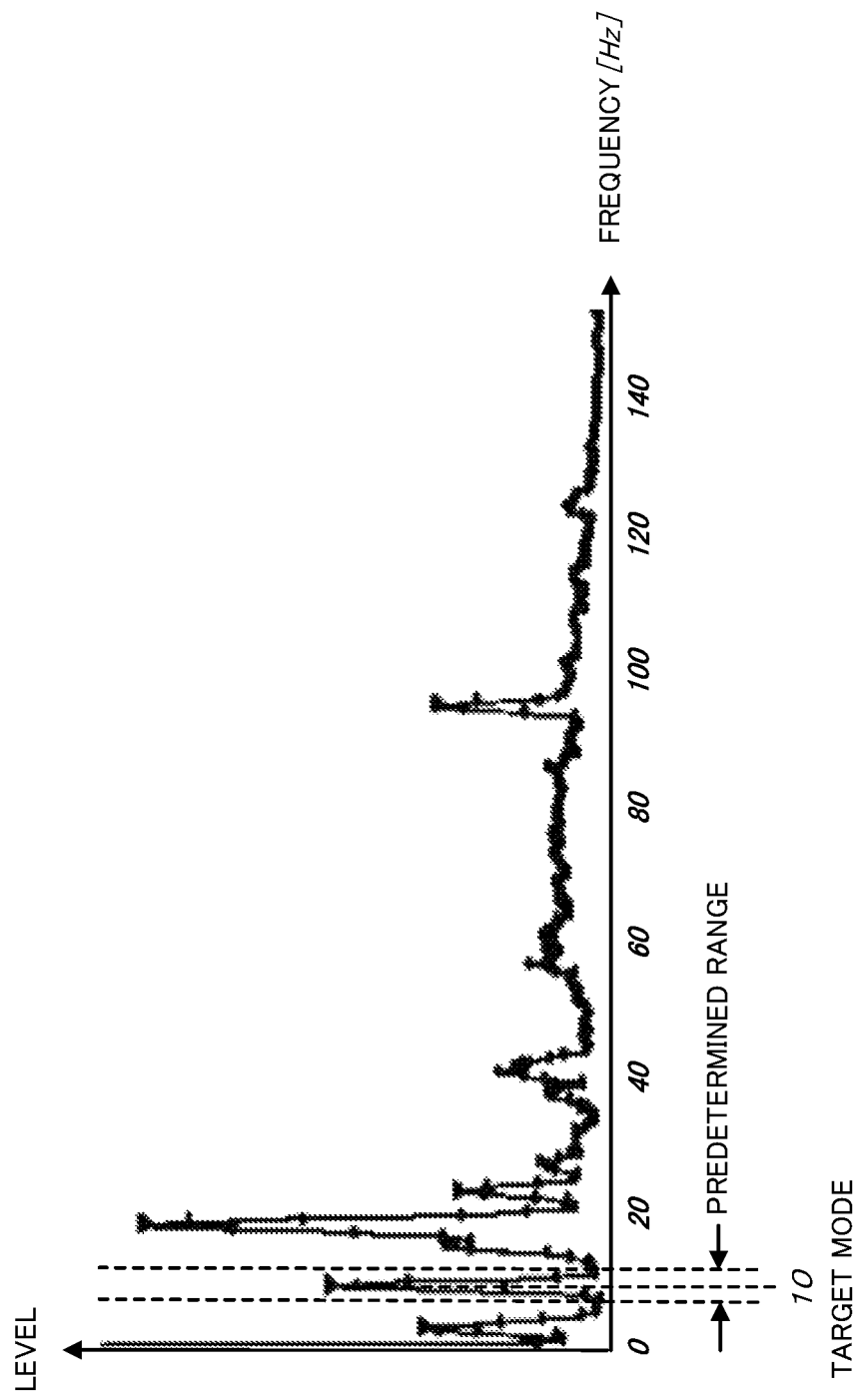
FIG. 3 is a diagram for showing an amplitude spectrum resulting from the Fourier transform of a measured vibrational wave.

FIG. 3 is a diagram for showing an amplitude spectrum resulting from the Fourier transform of a measured vibrational wave (illustrates absolute values of Fourier components obtained through the Fourier transform of one vibrational wave obtained through multiple vibration tests). In an example of FIG. 3, 10 Hz has been set in advance as the target mode. For example, a mode with which a change in the structure 20 is easily diagnosed is set as the target mode.

Next, the target vibration information generation unit 2 generates a mode vector indicating vibrations in the target mode. For example, with respect to the target mode, the target vibration information generation unit 2 generates a mode vector using complex vectors for the respective sensors 21a to 21e as indicated by formula (1).

[Math. 1]

$$|\phi_m\rangle = \begin{pmatrix} A^m(x_1)e^{i\theta^m(x_1)} \\ A^m(x_2)e^{i\theta^m(x_2)} \\ A^m(x_3)e^{i\theta^m(x_3)} \\ A^m(x_4)e^{i\theta^m(x_4)} \\ A^m(x_5)e^{i\theta^m(x_5)} \end{pmatrix} \quad (1)$$

$|\phi_m\rangle$: a mode vector using a complex vector
$m$: a sign for identification among a plurality of modes
$x_n$: a distance from an origin $P0$ to each sensor (where $n$ is 1 to 5)
$A^m(x_n)$: an amplitude in a natural frequency (where $n$ is 1 to 5)
$\theta^m(x_n)$: a phase in a natural frequency (where $n$ is 1 to 5)

Furthermore, the target vibration information generation unit 2 may generate target vibration information indicating vibrations in a mode included in a predetermined range that includes the target mode. This is because it is predicted that the frequency corresponding to the target mode shifts due to such influences as allowable error and the measurement accuracy of the sensors 21 mounted on the structure 20, the accuracy of vibration generation in vibration tests, a load on the structure, and a change in the structure 20. In view of this, the frequency corresponding to the target mode encompasses frequencies within a predetermined range that is predicted to cover the shift from the frequency corresponding to the target mode due to the aforementioned influences. In the example of FIG. 3, a predetermined range including 10 Hz has been set as a frequency in the target mode. The predetermined range is, for example, derived through an experiment, a simulation, machine learning, and the like, and stored in advance.

The comparative relationship information generation unit 3 generates comparative relationship information (reference relationship information: an index indicating a similarity degree) indicating the relationship between pieces of reference vibration information in the reference period. The comparative relationship information generation unit 3 also generates comparative relationship information (an index indicating a similarity degree) indicating the relationship between reference vibration information generated in the reference period and target vibration information generated in the diagnosis period.

Specifically, the comparative relationship information generation unit 3 calculates MACs indicating the relationships among a plurality of mode vectors generated in vibration tests that were carried out in the reference period. That is to say, the comparative relationship information generation unit 3 selects two mode vectors from among the plurality of mode vectors generated in the vibration tests that were carried out in the reference period, and calculates a MAC indicating the two selected mode vectors in accordance with processing indicated by formula (2). The comparative relationship information generation unit 3 may calculate a plurality of MACs in accordance with arbitrary combinations of mode vectors included among the plurality of mode vectors.

Also, MACs indicating the relationships among mode vectors generated in the vibration tests that were carried out in the reference period and mode vectors generated in the vibration tests that were carried out in the diagnosis period are calculated. In this case, for example, one vector is selected from among a plurality of mode vectors calculated based on vibrations in the reference period, one vector is selected from among mode vectors calculated based on vibrations in the diagnosis period, and a MAC is calculated in relation to the two selected vectors. That is to say, a MAC is a value calculated based on one mode vector in the reference period and one mode vector in the diagnosis period. Therefore, in this case, the number of MACs that can be calculated is the number of combinations of a mode vector in the reference period and a mode vector in the diagnosis period. For example, with respect to the target mode, the comparative relationship information generation unit 3 calculates MACs using formula (2).

[Math. 2]

$$MAC(m_1, m_2) = \frac{\langle \phi_{m_1} | \phi_{m_2} \rangle^2}{\langle \phi_{m_1} | \phi_{m_1} \rangle \langle \phi_{m_2} | \phi_{m_2} \rangle} \quad (2)$$

$MAC(m_1, m_2)$ : modal assurance criterion,
a correlation between mode vectors $|\phi_{m_1}\rangle, |\phi_{m_2}\rangle$ : mode vector Note that when M vibration tests were carried out in the reference period, $_MC_2$ MACs are calculated from combinations of M mode vectors. Note that when a normal mode vector can be calculated only (M−m) times in M vibration tests, $_{M-m}C_2$ MACs are calculated.

Also, when M vibration tests were carried out in the reference period and N vibration tests were carried out in the diagnosis period, (N×M) MACs are calculated from combinations of M mode vectors generated in the reference period and N mode vectors generated in the diagnosis period. Note that when normal mode vectors cannot be calculated in one or both of the diagnosis period and the reference period, MACs are calculated using normal mode vectors. For example, when N mode vectors can be calculated in the diagnosis period and a normal mode vector can be calculated only (M−m) times in M vibration tests in the reference period, (N×(M−m)) MACs are calculated.

Alternatively, the comparative relationship information generation unit 3 may generate comparative relationship information indicating the relationship between pieces of target vibration information generated in the diagnosis period, other than comparative relationship information indicating the relationship between reference vibration information generated in the reference period and target vibration information generated in the diagnosis period. Specifically, the comparative relationship information generation unit 3 calculates MACs indicating the relationships among mode vectors using a plurality of mode vectors generated in vibration tests that were carried out in the diagnosis period. For example, when N vibration tests were carried out in the diagnosis period, $_NC_2$ MACs are calculated from combinations of N mode vectors. Note that when a normal mode vector can be calculated only (N−n) times in N vibration tests, $_{N-n}C_2$ MACs are calculated.

Note that the aforementioned M is a positive integer equal to or larger than 2. m is a positive integer smaller than M. N is a positive integer equal to or larger than 2. n is a positive integer smaller than N.

Furthermore, comparative relationship information is not limited to a MAC. For example, a COMAC may be used as comparative relationship information. In this case, first, the target vibration information generation unit 2 calculates a coordinate mode vector based on information indicating the magnitudes of vibrations (vibrational waves) of the structure 20 that were measured by the plurality of sensors 21a to 21e in the aforementioned diagnosis period and reference period. For example, with respect to the target mode, the target vibration information generation unit 2 calculates a coordinate mode vector using formula (3).

[Math. 3]

$$|\Psi_x\rangle = \begin{pmatrix} A^1(x)e^{i\theta^1(x)} \\ A^2(x)e^{i\theta^2(x)} \\ \vdots \\ A^m(x)e^{i\theta^m(x)} \end{pmatrix} \quad (3)$$

$|\Psi_x\rangle$ : a coordinate mode vector using a complex vector
$m$ : a sign for indentification among a plurality of modes
$x$ : coordinates of each sensor based on an original $P0$
$A^l(x)$ : an amplitude in the $l^{th}$ mode (where $l$ is 1 to $m$)
$\theta^l(x)$ : a phase in the $l^{th}$ mode (where $l$ is 1 to $m$)

Next, the comparative relationship information generation unit 3 generates comparative relationship information indicating the relationship between a coordinate mode vector generated in the reference period and a coordinate mode vector generated in the diagnosis period, or comparative relationship information indicating the relationship between coordinate mode vectors generated in the diagnosis period. Note that with respect to the target mode, the comparative relationship information generation unit 3 calculates, for example, a COMAC using formula (4).

[Math. 4]

$$COMAC(x^{r1}, x^{r2}) = \frac{\langle \Psi_{x^{r1}} | \Psi_{x^{r2}} \rangle^2}{\langle \Psi_{x^{r1}} | \Psi_{x^{r1}} \rangle \langle \Psi_{x^{r2}} | \Psi_{x^{r2}} \rangle} \quad (4)$$

$COMAC(x^{r1}, x^{r2})$ : modal assurance criterion,
a correlation between coordinate mode vectors $|\Psi_{x^{r1}}\rangle, |\Psi_{x^{r1}}\rangle$ : coordinate mode vectors
at the same position in different periods $r$ : a sign for identifying a certain period Furthermore, a method for indicating the relationship between two modes other than a MAC and a COMAC may be used. Specifically, the relationship may be indicated by Fourier-transforming mode waveforms in real-space and by using a difference between values corresponding to mode waveforms in a Fourier-transformed space (e.g., reciprocal lattice space, reciprocal space, momentum space, wavenumber space, k-space, etc.).

The distribution calculation unit 4 calculates the distribution of pieces of reference relationship information indicating the relationships among pieces of reference vibration information in the reference period. The distribution calculation unit 4 also calculates the distribution of pieces of comparative relationship information indicating the relationships among pieces of reference vibration information generated in the reference period and pieces of target vibration information. Alternatively, the distribution calculation unit 4 may calculate the distribution of pieces of comparative relationship information indicating the relationships among pieces of target vibration information generated in the diagnosis period.

The distribution is, for example, the distribution of MACs calculated in accordance with processing that has been described above with reference to formula (2). Also, the distribution calculation unit 4, for example, analyzes the frequency of a plurality of MACs that have been calculated in relation to pieces of reference vibration information to calculate the distribution of the plurality of MACs related to the pieces of reference relationship information. Furthermore, the distribution calculation unit 4 analyzes the frequency of a plurality of MACs that have been calculated in relation to pieces of reference vibration information and pieces of target vibration information to calculate the distribution of the plurality of MACs related to the pieces of comparative relationship information.

Figure 4:
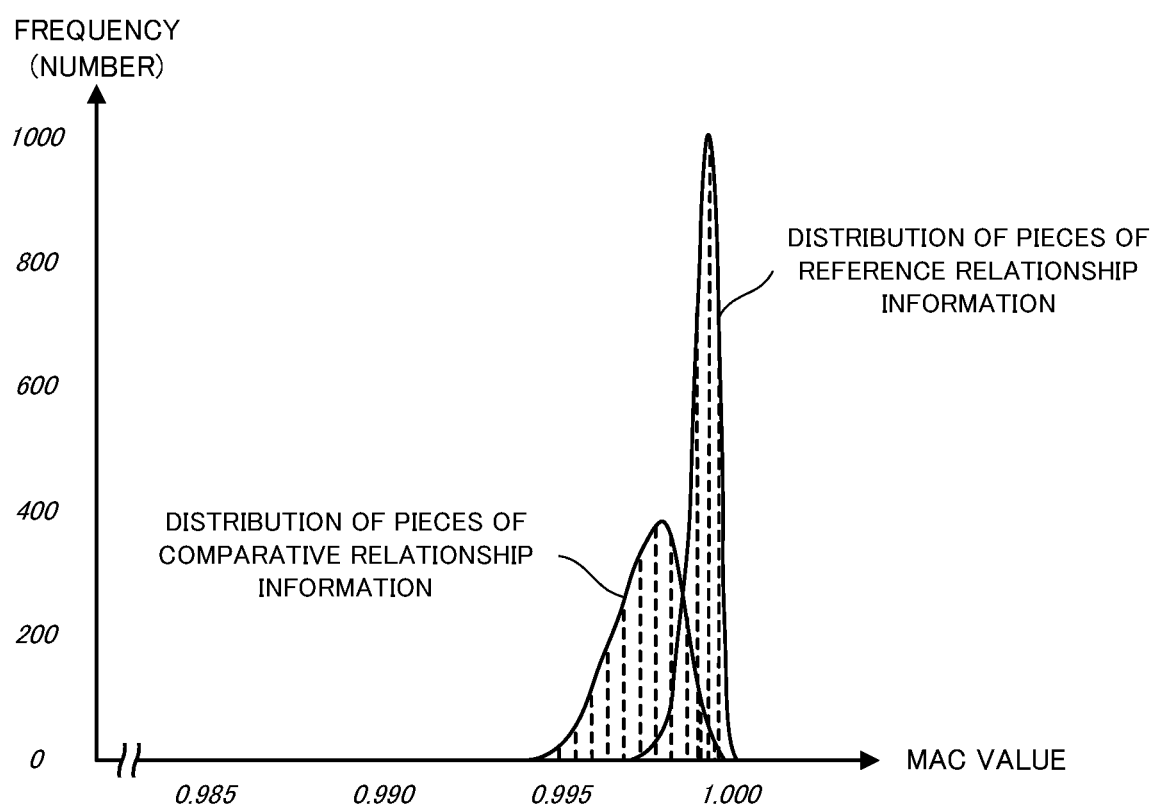
FIG. 4 is a diagram for showing a distribution of pieces of reference relationship information and a distribution of pieces of comparative relationship information.

Specifically, the distribution calculation unit 4 calculates information indicating a correlation distribution, such as a frequency distribution, using pieces of reference relationship information and pieces of comparative relationship information that have been calculated using, for example, MACs or COMACs. FIG. 4 is a diagram for showing the distribution of pieces of reference relationship information and the distribution of pieces of comparative relationship information.

The diagnosis unit 5 diagnoses that a change occurred in the structure between the diagnosis period and the reference period when there is a distribution difference equal to or larger than a predetermined difference between the distribution of pieces of reference relationship information indicating the relationships among pieces of reference vibration information and the distribution calculated in relation to pieces of comparative relationship information.

Specifically, the diagnosis unit 5 calculates a difference between frequency distributions using information indicating the distribution of pieces of reference relationship information and information indicating the distribution of pieces of comparative relationship information, and diagnoses that a change has occurred in the structure 20 when the calculated difference between the frequency distributions is equal to or larger than the predetermined difference. On the other hand, when the calculated difference between the frequency distributions is smaller than the predetermined difference, the diagnosis unit 5 diagnoses that no change has occurred in the structure 20.

For example, an upper limit value and a lower limit value that define a 95% confidential interval for the distribution of pieces of reference relationship information are calculated in advance, and the diagnosis unit 5 diagnoses that a change has occurred in the structure 20 when an average value or a median value of pieces of comparative relationship information is larger than the upper limit value or is smaller than the lower limit value. Also, when 50% or more of the distribution of pieces of comparative relationship information exceeds the upper limit value, the diagnosis unit 5 diagnoses that a change has occurred in the structure 20. Note that the aforementioned 95%, 50%, and the like are examples, and no limitation is intended thereby.

Note that as a diagnosis method, for example, the Hotelling method, the Mahalanobis distance, the Kullback-Leibler distance, the Pearson distance, and the like may be used in addition to hypothesis testing (e.g., a significant difference test).

[Apparatus Operations]

Figure 5:
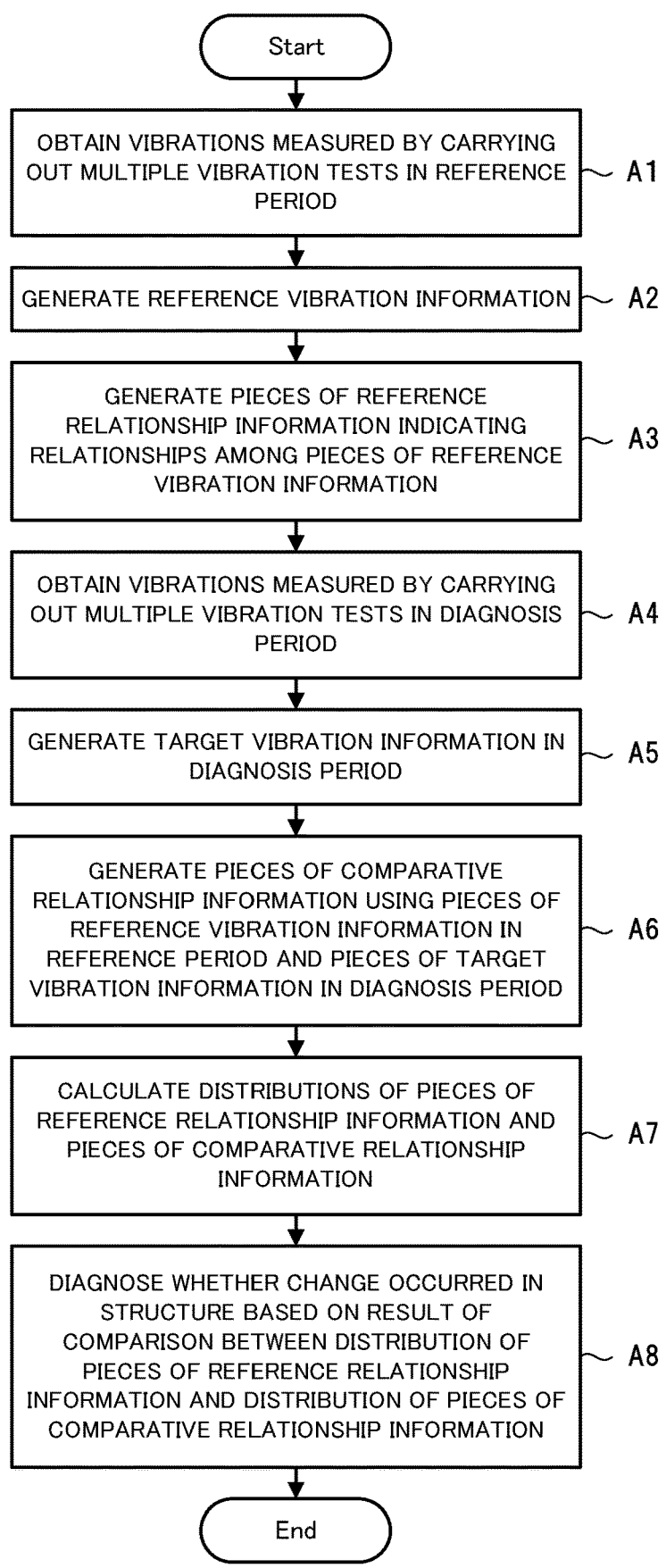
FIG. 5 is a diagram for showing exemplary operations of the diagnosis apparatus.

Next, a description is given of the operations of the diagnosis apparatus according to the example embodiment of the present invention using FIG. 5. FIG. 5 is a diagram for showing exemplary operations of the diagnosis apparatus. In the following description, FIG. 2 to FIG. 4 will be referred to as appropriate. Furthermore, in the present example embodiment, the diagnosis method is carried out by causing the diagnosis apparatus to operate. Therefore, the following description of the operations of the diagnosis apparatus applies to the diagnosis method according to the present example embodiment.

In step A1, the target vibration information generation unit 2 obtains information indicating the magnitudes of a plurality of vibrations (vibrational waves) that were measured using the sensors 21 when a plurality of vibration tests were carried out in the reference period. The reference period is a period that precedes the diagnosis period, and is a period in which it can be considered that no change occurs in the structure 20.

In step A2, the target vibration information generation unit 2 generates reference vibration information with respect to a target mode in the reference period. Specifically, with respect to the target mode, the target vibration information generation unit 2 generates a mode vector with respect to the sensors $21a$ to $21e$ using formula (1). Alternatively, the target vibration information generation unit 2 generates a coordinate mode vector using formula (3).

In step A3, the comparative relationship information generation unit 3 generates pieces of reference relationship information indicating the relationships among pieces of reference vibration information in the reference period. Specifically, with respect to the target mode, the comparative relationship information generation unit 3 calculates MACs using formula (2). For example, when M vibration tests were carried out in the reference period, $_MC_2$ MACs are calculated from combinations of M mode vectors. Note that when a normal mode vector can be calculated only (M−m) times in the M vibration tests, $_{M-m}C_2$ MACs are calculated. Also, with respect to the target mode, the comparative relationship information generation unit 3 may calculate COMACs using formula (4) in step A3. Furthermore, MACs need not be calculated for all of the combinations, and may be calculated only for a part of the combinations.

In step A4, the target vibration information generation unit 2 obtains information indicating the magnitudes of a plurality of vibrations (vibrational waves) that were measured using the sensors 21 when a plurality of vibration tests were carried out in the diagnosis period, which is a period that takes place after the reference period.

In step A5, the target vibration information generation unit 2 generates target vibration information with respect to the target mode in the diagnosis period. Specifically, the target vibration information generation unit 2 selects a mode included within the predetermined range, which includes the target mode set in step A2, and generates a mode vector corresponding to the selected mode. For example, with respect to the target mode, the target vibration information generation unit 2 generates a mode vector with respect to the sensors 21a to 21e using formula (1). Alternatively, the target vibration information generation unit 2 generates a coordinate mode vector using formula (3).

In step A6, the comparative relationship information generation unit 3 generates pieces of comparative relationship information using pieces of reference vibration information in the reference period and pieces of target vibration information in the diagnosis period. Specifically, with respect to the target mode, the comparative relationship information generation unit 3 calculates MACs using formula (2). Specifically, when M vibration tests were carried out in the reference period and N vibration tests were carried out in the diagnosis period, (N×M) MACs are calculated from combinations of M mode vectors generated in the reference period and N mode vectors generated in the diagnosis period. MACs need not be calculated for all of the combinations, and may be calculated only for a part of the combinations.

Note that when normal mode vectors cannot be calculated in one or both of the reference period and the diagnosis period, MACs are calculated using normal mode vectors. For example, when N mode vectors can be calculated in the diagnosis period and a normal mode vector can be calculated only (M−m) times in M vibration tests in the reference period, (N×(M−m)) MACs are calculated. Also, with respect to the target mode, the comparative relationship information generation unit 3 may calculate COMACs using formula (4) in step A6.

Alternatively, the comparative relationship information generation unit 3 may generate pieces of comparative relationship information indicating the relationships among pieces of target vibration information generated in the diagnosis period in step A6. Specifically, the comparative relationship information generation unit 3 calculates MACs indicating the relationships among mode vectors using a plurality of mode vectors generated in vibration tests that were carried out in the diagnosis period. For example, when N vibration tests were carried out in the diagnosis period, $_NC_2$ MACs are calculated from combinations of N mode vectors. Note that when a normal mode vector can be calculated only (N−n) times in N vibration tests, $_{N-n}C_2$ MACs are calculated. MACs need not be calculated for all of the combinations, and may be calculated only for a part of the combinations.

In step A7, the distribution calculation unit 4 calculates the distributions of pieces of reference relationship information and pieces of comparative relationship information. Specifically, the distribution calculation unit 4 calculates correlation distributions, such as frequency distributions, shown in FIG. 4 using pieces of reference relationship information and pieces of comparative relationship information that have been calculated using, for example, MACs or COMACs.

In step A8, the diagnosis unit 5 diagnoses whether a change has occurred in the structure based on the result of comparison between the distribution of pieces of reference relationship information and the distribution of pieces of comparative relationship information. Specifically, the diagnosis unit 5 calculates a difference between the frequency distributions using information indicating the distribution of pieces of reference relationship information and information indicating the distribution of pieces of comparative relationship information, and diagnoses that a change has occurred in the structure 20 when the calculated difference between the frequency distributions is equal to or larger than the predetermined difference. On the other hand, when the calculated difference between the frequency distributions is smaller than the predetermined difference, the diagnosis unit 5 diagnoses that no change has occurred in the structure 20. Then, after processing of step A8 has been completed, the diagnosis apparatus 1 specifies a section that has changed when it has been diagnosed that a change has occurred in the structure 20.

[Effects of Embodiment]

As described above, according to the present example embodiment, the occurrence of a change in the structure is diagnosed based on the result of comparison between the distribution of pieces of reference relationship information, which indicate the relationships among pieces of reference vibration information, and the distribution calculated in relation to pieces of comparative relationship information, and thus the accuracy of diagnosis of the change in the structure is improved. That is to say, even if a mode vector varies with each measurement due to such influences as allowable error and the measurement accuracy of the sensors mounted on the structure, the accuracy of vibration generation in a vibration test, and a load on the structure, the change can be diagnosed with high accuracy due to the presence of a standard.

[Program]

It is sufficient for a diagnosis program according to the example embodiment of the present invention to be a program that causes a computer to execute steps A1 to A8 shown in FIG. 5. The diagnosis apparatus and the diagnosis method according to the present example embodiment can be realized by installing this program in the computer and executing this program. In this case, a processor of the computer functions as the target vibration information generation unit 2, comparative relationship information generation unit 3, distribution calculation unit 4, and diagnosis unit 5, and performs processing.

Also, the program according to the present example embodiment may be executed by a computer system constructed with a plurality of computers. In this case, for example, the computers may respectively function as the target vibration information generation unit 2, comparative relationship information generation unit 3, distribution calculation unit 4, and diagnosis unit 5.

The above example embodiment has been described with reference to an example where a period in which the structure 20 is normal is set as the reference period. However, the reference period need not necessarily be the period in which the structure 20 is normal, and may be a period in which a change occurs therein. That is to say, it is sufficient for the reference period to be a certain period, and is not limited to the above-described example. Therefore, the diagnosis apparatus 1 can diagnose whether a change occurred in the structure 20 between the reference period and the diagnosis period.

[Physical Configuration]

Figure 6:
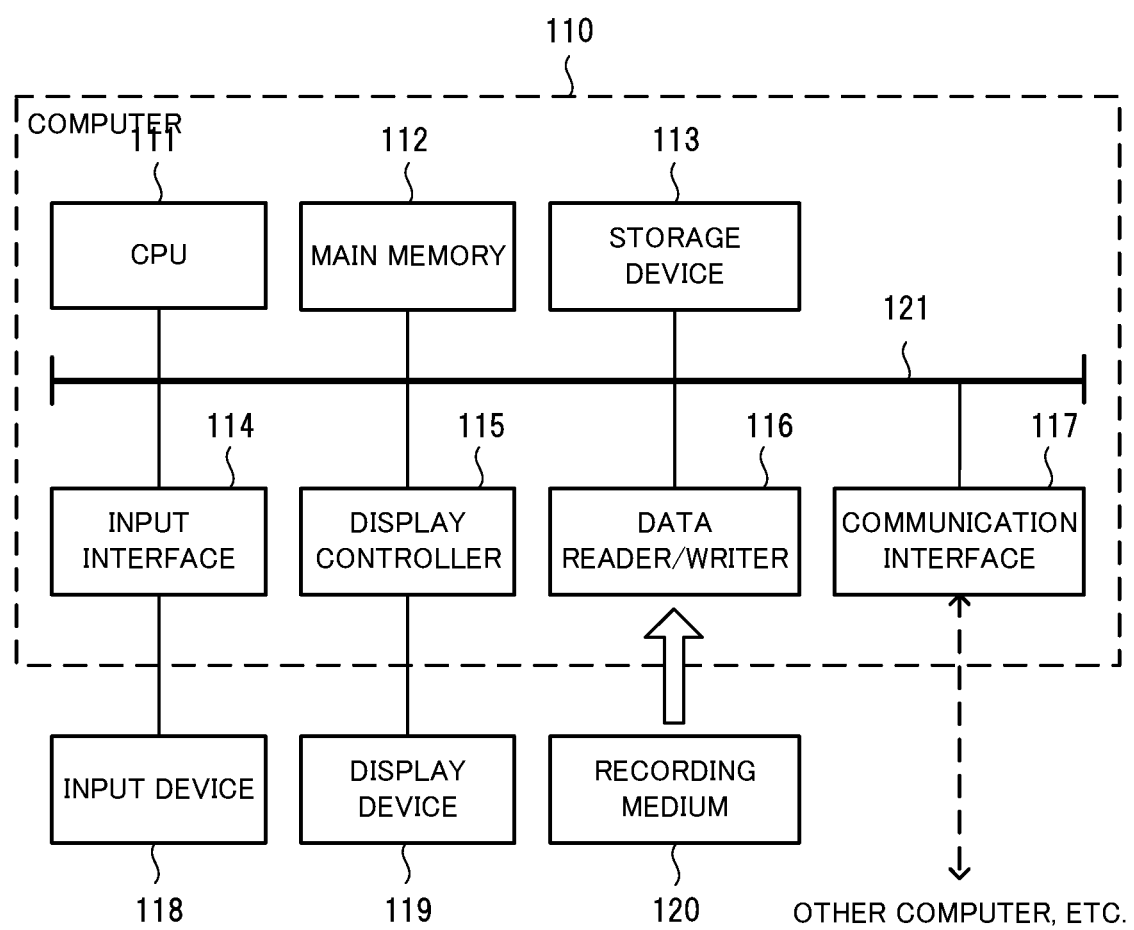
FIG. 6 is a diagram for showing an example of a computer that realizes the diagnosis apparatus.

Here, a computer that realizes the diagnosis apparatus 1 by executing the program in the present embodiment will be described with reference to FIG. 6. FIG. 6 is a diagram for showing one example of a computer realizing the diagnosis apparatus.

As illustrated in FIG. 6, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the program (codes) in the present example embodiment, which is stored in the storage device 113, onto the main memory 112, and performs various computations by executing these codes in a predetermined order. The main memory 112 is typically a volatile storage device such as a dynamic random access memory (DRAM) or the like. Also, the program in the present example embodiment is provided in a state such that the program is stored in a computer readable recording medium 120. Note that the program in the present example embodiment may also be a program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading of the program from the recording medium 120 and the writing of results of processing in the computer 110 to the recording medium 120. The communication interface 117 mediates data transmission between the CPU 111 and other computers.

Also, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

INDUSTRIAL APPLICABILITY

The present invention can improve the accuracy of diagnosis of a change in a structure. The present invention is advantageous in, for example, the fields that require a diagnosis of a structure.

REFERENCE SIGNS LIST

1 diagnosis apparatus
2 target vibration information generation unit
3 comparative relationship information generation unit
4 distribution calculation unit
5 diagnosis unit
20 structure
21, 21*a*, 21*b*, 21*c*, 21*d*, 21*e* sensor
vibration response analysis unit
110 computer
111 CPU
112 main memory
113 storage device
114 input interface
115 display controller
116 data reader/writer
117 communication interface
118 input apparatus
119 display apparatus
120 recording medium
121 bus

The invention claimed is:

1. A diagnosis apparatus comprising:
a target vibration information generation unit that generates pieces of target vibration information indicating mode vector vibrations in a target mode among vibrations of a structure that are measured in a diagnosis period using a plurality of sensors mounted on the structure during vibration tests of the structure and pieces of reference vibration information indicating the mode vector vibrations in the target mode among the vibrations of the structure that are measured using the plurality of sensors mounted on the structure during the vibration tests of the structure in a reference period that is different from the diagnosis period;
a comparative relationship information generation unit that generates reference relationship information that is an index indicating a similarity degree between the pieces of reference vibration information and comparative relationship information that is an index indicating a similarity degree between the pieces of reference vibration information and the pieces of target vibration information;
a distribution calculation unit that calculates a distribution of the reference relationship information and a distribution of the comparative relationship information; and
a diagnosis unit that diagnoses that a change has occurred in the structure between the diagnosis period and the reference period when there is a distribution difference equal to or larger than a predetermined difference between the distribution of the reference relationship information and the distribution of the comparative relationship information.

2. The diagnosis apparatus according to claim 1, wherein the target vibration information generation unit generates the pieces of target vibration information indicating the vibrations in a mode that is included in a predetermined range including the target mode.

3. A diagnosis method comprising:
generating pieces of target vibration information indicating mode vector vibrations in a target mode among vibrations of a structure that are measured in a diagnosis period using a plurality of sensors mounted on the structure during vibration tests of the structure and pieces of reference vibration information indicating the mode vector vibrations in the target mode among the vibrations of the structure that are measured that are measured using the plurality of sensors mounted on the structure during the vibration tests of the structure in a reference period that is different from the diagnosis period;
generating reference relationship information that is an index indicating a similarity degree between the pieces of reference vibration information and comparative relationship information that is an index indicating a similarity degree between the pieces of reference vibration information and the pieces of target vibration information;
calculating a distribution of the reference relationship information and a distribution of the comparative relationship information; and
diagnosing that a change has occurred in the structure between the diagnosis period and the reference period when there is a distribution difference equal to or larger than a predetermined difference between the distribution of the reference relationship information and the distribution of the comparative relationship information.

4. The diagnosis method according to claim 3, wherein generating pieces of target vibration information comprises generating the pieces of target vibration information indicating the vibrations in a mode that is included in a predetermined range including the target mode are generated.

5. A non-transitory computer-readable recording medium having recorded therein a diagnosis program for causing a computer to carry out:

generating pieces of target vibration information indicating mode vector vibrations in a target mode among vibrations of a structure that are measured in a diagnosis period using a plurality of sensors mounted on the structure during vibration tests of the structure and pieces of reference vibration information indicating the mode vector vibrations in the target mode among the vibrations of the structure that are measured in a reference period that are measured using the plurality of sensors mounted on the structure during the vibration tests of the structure that is different from the diagnosis period;

generating reference relationship information that is an index indicating a similarity degree between the pieces of reference vibration information and comparative relationship information that is an index indicating a similarity degree between the pieces of reference vibration information and the pieces of target vibration information;

calculating a distribution of the reference relationship information and a distribution of the comparative relationship information; and diagnosing that a change has occurred in the structure between the diagnosis period and the reference period when there is a distribution difference equal to or larger than a predetermined difference between the distribution of the reference relationship information and the distribution of the comparative relationship information.

6. The non-transitory computer-readable recording medium according to claim 5, wherein generating pieces of target vibration information comprises generating the pieces of target vibration information indicating the vibrations in a mode that is included in a predetermined range including the target mode are generated.

* * * * *